US006178578B1

(12) United States Patent
Soltani et al.

(10) Patent No.: US 6,178,578 B1
(45) Date of Patent: Jan. 30, 2001

(54) PRESSURE CONTROL ASSEMBLY FOR AN AIR MATTRESS

(75) Inventors: Sohrab Soltani, Charleston; James J. Romano; Timothy W. Perez, both of James Island, all of SC (US)

(73) Assignee: Hill-Rom, Inc., Batesville, IN (US)

( * ) Notice: Under 35 U.S.C. 154(b), the term of this patent shall be extended for 0 days.

(21) Appl. No.: 09/135,350

(22) Filed: Aug. 17, 1998

Related U.S. Application Data

(62) Division of application No. 08/663,994, filed on Jun. 14, 1996, now Pat. No. 5,794,288.

(51) Int. Cl.[7] ............................ A47C 27/10; A01G 7/057
(52) U.S. Cl. ........................................................ 5/713
(58) Field of Search ................................ 5/710, 713, 714, 5/708

(56) References Cited

U.S. PATENT DOCUMENTS

| | | |
|---|---|---|
| 1,730,752 | 10/1929 | Withers . |
| 2,245,909 | 6/1941 | Enfiajian . |
| 2,604,641 | 7/1952 | Reed . |
| 2,997,100 | 6/1961 | Morris . |

(List continued on next page.)

FOREIGN PATENT DOCUMENTS 2 092 439 8/1982 (GB) .

OTHER PUBLICATIONS

"Mason's Support Surface Systems Will Take the Pressure Off", Mason Medical Products brochure, one page, date unknown.

"Base™ Deep Cell™ Low Air Loss Alternating Pressure Mattress", Progressive Medical Technology, Inc. brochure, 2 pages, Dec. 1994.

"Base™ Large Cel™ Low Air Loss Alternating Pressure System", Progressive Medical Technology, Inc. brochure, 2 pages, Sep. 1994.

"DFS® Homecare Advanced Dynamic Flotation System", Huntleigh Nesbit Evans Heathcare brochure, 2 pages, date unknown.

"ASAP II Therapy System", DynaMedics Corporation brochure, 2 pages, Mar. 1995.

"Supporting the Healing Process", National Patient Care Systems brochure, 2 pages, date unknown.

"Apropos CRS–8500", National Patient Care Systems brochure, one page, date unknown.

"Renaissance™ Therapeutic Mattress Replacement System", Pegasus Airwave brochure, 2 pages, date unknown.

"SpanCare® Geo–Matt", Span America Medical Systems, Inc. brochure, 4 pages, date unknown.

"SelectAir™ The advanced, affordable Low Air Loss Therapy system.", Therapy Concepts, Inc. brochure, 4 pages, date unknown.

"Economic Relief.", Sunrise Medical Bio Clinic brochure, 2 pages, date unknown.

"Bazooka Product Brochure", Universal Hospital Services, Inc. brochure, 19 pages, 1995.

(List continued on next page.)

*Primary Examiner*—Alexander Grosz
(74) *Attorney, Agent, or Firm*—Bose McKinney & Evans LLP

(57) ABSTRACT

A mattress is provided having an elongated foam base, a plurality of air sacks positioned above the foam base, and a longitudinally-extending manifold. Each air sack defines an interior region. The manifold includes an outer wall defining an interior region in fluid communication with a source of pressurized fluid and in fluid communication with the interior region of each air sack. The foam base and the plurality of air sacks cooperate to define a channel. The manifold is positioned in the channel and supported on top of the foam base.

31 Claims, 5 Drawing Sheets

U.S. PATENT DOCUMENTS

| | | | | |
|---|---|---|---|---|
| 3,583,008 | | 6/1971 | Edwards . | |
| 3,772,717 | | 11/1973 | Yuen et al. . | |
| 3,978,530 | | 9/1976 | Amarantos . | |
| 4,042,988 | | 8/1977 | Holliday . | |
| 4,306,322 | | 12/1981 | Young et al. . | |
| 4,435,864 | | 3/1984 | Callaway . | |
| 4,488,322 | | 12/1984 | Hunt et al. . | |
| 4,525,885 | * | 7/1985 | Hunt et al. | 5/713 |
| 4,541,135 | | 9/1985 | Karpov . | |
| 4,637,083 | | 1/1987 | Goodwin . | |
| 4,638,519 | | 1/1987 | Hess . | |
| 4,644,597 | | 2/1987 | Walker . | |
| 4,694,520 | | 9/1987 | Paul et al. . | |
| 4,745,647 | | 5/1988 | Goodwin . | |
| 4,768,249 | | 9/1988 | Goodwin . | |
| 4,788,729 | | 12/1988 | Walker . | |
| 4,797,962 | | 1/1989 | Goode . | |
| 4,798,227 | | 1/1989 | Goodwin . | |
| 4,803,744 | | 2/1989 | Peck et al. . | |
| 4,829,616 | | 5/1989 | Walker . | |
| 4,890,344 | | 1/1990 | Walker . | |
| 4,896,389 | | 1/1990 | Chamberland . | |
| 4,908,895 | | 3/1990 | Walker . | |
| 4,914,760 | | 4/1990 | Hargest et al. . | |
| 4,935,968 | | 6/1990 | Hunt et al. . | |
| 4,942,635 | | 7/1990 | Hargest et al. . | |
| 4,944,060 | * | 7/1990 | Perry et al. | 5/713 |
| 4,947,500 | | 8/1990 | Seiler . | |
| 4,949,412 | | 8/1990 | Goode . | |
| 4,949,413 | | 8/1990 | Goodwin . | |
| 4,949,414 | | 8/1990 | Thomas et al. . | |
| 4,951,335 | | 8/1990 | Eady . | |
| 4,967,431 | | 11/1990 | Hargest et al. . | |
| 4,982,466 | | 1/1991 | Higgins et al. . | |
| 4,986,738 | | 1/1991 | Kawasaki et al. . | |
| 4,991,244 | | 2/1991 | Walker . | |
| 4,998,310 | | 3/1991 | Olson . | |
| 5,005,240 | | 4/1991 | Vrzalik . | |
| 5,022,110 | | 6/1991 | Stroh . | |
| 5,029,352 | | 7/1991 | Hargest et al. . | |
| 5,052,067 | | 10/1991 | Thomas et al. . | |
| 5,062,167 | | 11/1991 | Thomas et al. . | |
| 5,067,189 | | 11/1991 | Weedling et al. . | |
| 5,070,560 | | 12/1991 | Wilkinson . | |
| 5,073,999 | | 12/1991 | Thomas et al. . | |
| 5,095,568 | | 3/1992 | Thomas et al. . | |
| 5,103,519 | | 4/1992 | Hasty . | |
| 5,121,513 | | 6/1992 | Thomas et al. . | |
| 5,182,826 | | 2/1993 | Thomas et al. . | |
| 5,243,723 | | 9/1993 | Cotner et al. . | |
| 5,251,349 | | 10/1993 | Thomas et al. . | |
| 5,267,364 | | 12/1993 | Volk . | |
| 5,325,551 | | 7/1994 | Tappel et al. . | |
| 5,367,728 | | 11/1994 | Chang . | |
| 5,394,577 | | 3/1995 | James et al. . | |
| 5,402,542 | | 4/1995 | Viard . | |
| 5,483,709 | | 1/1996 | Foster et al. . | |
| 5,539,942 | | 7/1996 | Melou . | |
| 5,542,136 | | 8/1996 | Tappel . | |
| 5,560,374 | | 10/1996 | Viard . | |
| 5,561,873 | | 10/1996 | Weedling . | |
| 5,564,142 | | 10/1996 | Liu . | |
| 5,594,963 | | 1/1997 | Berkowitz . | |
| 5,603,133 | | 2/1997 | Vrzalik . | |
| 5,611,096 | | 3/1997 | Bartlett et al. . | |
| 5,634,225 | * | 6/1997 | Miller, Sr. et al. | 5/710 |
| 5,655,239 | | 8/1997 | Caparon et al. . | |
| 5,701,622 | | 12/1997 | Biggie et al. . | |
| 5,729,853 | * | 3/1998 | Thompson | 5/713 |
| 5,787,531 | * | 8/1998 | Pepe | 5/710 |

OTHER PUBLICATIONS

"Pneu–Care® Series Pro 2000 Mrs F.A.S.T.$^{SM}$ Low Air Loss Alternating Mattress Replacement System", Baxter Healthcare Corporation brochure, one page, date unknown.
"First Step™ Mattress Replacement System", KCI brochure, 2 pages, Feb. 1991.
"Impression™ Pressure Relief Therapy", KCI brochure, 2 pages, date unknown.
"microAir™ 1000 Portable Air Loss Therapy System", GSI Medical Systems brochure, 2 pages, 1989.
"Air Flow 5000 Mattress Replacement System", Atlantis Medical brochure, 2 pages, date unknown.
Sof–Care Plus® Companion™ System, Gaymar Industries, Inc. brochure, 2 pages, 1994.
"AltaDyne™ Alternating Pressure", Lumex brochure, 4 pages, 1992.
"Akrotech 4000", Lumex brochure, 4 pages, date unknown.

* cited by examiner

PRESSURE CONTROL ASSEMBLY FOR AN AIR MATTRESS

BACKGROUND SUMMARY OF THE INVENTION

This application is a divisional of U.S. application Ser. No. 08/663,994, filed on Jun. 14, 1996, now U.S. Pat. No. 5,794,288.

The present invention relates to a mattress, a mattress overlay, or a mattress replacement system including an air system having air sacks for supporting a person, and more particularly to a pressure control assembly for controlling the pressure of pressurized fluid contained by a plurality of air sacks of an air mattress. Each air sack is in fluid communication with a manifold having an interior region that is maintained at a constant pressure. The constant pressure of the pressurizing fluid within the manifold may be the same as or may be different from the pressure of pressurized fluid within at least one of the air sacks.

Beds including mattresses, mattress overlays, or mattress replacement systems (hereinafter mattresses) can be provided with bladders or air sacks (hereinafter air sacks) to support a person and to provide adjustable support and firmness characteristics. The support and firmness characteristics of the mattress can be adjusted by inflating the air sacks to increase the firmness and support characteristics of the mattress or deflating the air sacks to provide plusher firmness and support characteristics. Additionally, some mattresses have separate and independent air sacks that can be independently inflated or deflated to adjust the firmness and support characteristics of selected portions of the mattress relative to other portions of the mattress.

Maintaining the pressure of a pressurizing fluid received within each air sack typically requires the use of a control system. For example, U.S. Pat. No. 4,694,520 to Paul et al., which is assigned to the assignee of the present invention, discloses a control system including a detector for determining inadequate inflation of the mattress.

For another example, U.S. Pat. No. 4,949,414 to Thomas et al., which is assigned to the assignee of the present invention, discloses a blower supplying pressurized gas to a plurality of elongated inflatable sacks. The disclosed patient support system includes means for maintaining a predetermined pressure in the sacks preferably including a microprocessor and a plurality of pressure control valves. Each pressure control valve can regulate the air delivered through the valve to the air sack and the pressure of air delivered by each valve is monitored by a pressure sensing device. Control electronics maintain the pressure on the downstream side of the blower at a predetermined pressure, for example, by adjusting the blower speed in response to a signal comparing the actual pressure to a desired pressure. Control electronics also control the mass flow rate through each valve and cause the valves to adjust to maintain the pressure on the downstream side of each pressure control valve at its selected pressure. In addition, U.S. Pat. No. 4,745,647 to Goodwin, which is also assigned to the assignee of the present invention, discloses a control system employing control electronics to control valve settings of variable flow gas valves to maintain the pressure in each sack at a preset pressure.

An inexpensive yet effective control assembly that is reliable, easy to manufacture, and easy to maintain is needed. A control system including a minimum number of parts minimizing the number of detectors and feedback loops needed to operate the control system, and particularly a control system including a minimum number of moving parts, would be appreciated by both manufacturers and users of such systems. In addition, such an inexpensive control system that could be adjusted so that the firmness and support characteristics of various portions of the mattress could be easily changed to suit the needs or desires of the person supported on top of the mattress would be appreciated by users of such control assemblies.

According to the present invention, a control system is provided for controlling the pressure of fluid within a chamber upon which a person rests. The control system includes a manifold having a wall defining an interior region in fluid communication with a source of pressurized fluid. An air sack defines the chamber. The air sack includes a wall defining an interior region of the air sack and the wall is formed to include an air loss opening in fluid communication with the interior region of the air sack. Thus, the interior region of the air sack is in fluid communication with the atmosphere outside of the air sack.

A flow control assembly includes a conduit in fluid communication with the interior region of the air sack and in fluid communication with the interior region of the manifold. The flow control assembly further includes a check valve in the conduit to prevent the flow of pressurized fluid through the conduit from the interior region of the air sack to the interior region of the manifold.

In preferred embodiments, the control system includes a blower supplying pressurized fluid to an interior region of a manifold. The pressurized fluid is preferably air, although any generally inert gas, such as nitrogen, could be used without exceeding the scope of the invention as presently perceived. The mattress, mattress overlay, or mattress replacement system (hereinafter mattress) includes a plurality of air bladders or air sacks (hereinafter air sacks), each of which is in fluid communication with the manifold through a control assembly. Preferably, one control assembly is associated with each air sack and only one air sack is associated with each control assembly, although it is within the scope of the invention as presently perceived to have more than one air sack associated with one control assembly.

When the blower is activated, pressurized fluid is provided to the manifold. Pressurized fluid within the manifold preferably remains at a predetermined constant pressure during the operation of the blower. If desired, control electronics including a pressure sensor sensing the pressure of the fluid in the manifold and a feed back loop controlling the operation of the blower can be provided for maintaining the pressure of the pressurized fluid in the manifold. When the system achieves steady state operation, pressurized fluid is provided from the manifold to each air sack through an orifice at a predetermined delivery flow rate. In addition, pressurized fluid is exhausted from each air sack through an orifice at a predetermined exhaust rate. Each sack is thus maintained at a pressure corresponding to the size of the orifice of the delivery line, the size of the orifice of the exhaust line, and the pressure of the pressurized fluid in the manifold. Once steady state is reached, changing the pressure of pressurized fluid in the manifold, changing the size of the orifice in the delivery line, or changing the size of the orifice in the exhaust line will change the pressure of the pressurized fluid in the air sack.

Each control assembly includes a conduit connecting the interior region of the manifold to the interior region of its associated air sack so that the interior region of the air sack is in fluid communication with the interior region of the manifold. An exhaust line is in fluid communication with the interior region of each conduit to allow the escape of pressurized fluid from the air sack and the control assembly. A plate carrying an exhaust control orifice is mounted in the exhaust line to restrict the flow of pressurized fluid through the exhaust line and a plate carrying an inlet control orifice is mounted in the interior region of the control assembly between the manifold and the exhaust line to restrict the flow of pressurized fluid from the manifold to its associated air sack The pressure within each air sack is related to the pressure of pressurized fluid in the interior region of the manifold, the flow rate of pressurized fluid through the inlet control orifice, and the flow rate of pressurized fluid through the exhaust control orifice which is equivalent to the flow rate of pressurized fluid through the inlet control orifice when the pressure control assembly is at steady state. The flow rate of pressurized fluid through each of the exhaust control orifice and the inlet control orifice depends upon the size of each orifice and the pressure drop between each side of the orifice. Thus, the pressure relative to atmospheric pressure within each air sack can be determined knowing the pressure of pressurized fluid in the manifold, the size of the opening of the inlet control orifice, and the size of the opening of the exhaust control orifice.

When a person resting on top of the mattress moves, the person's weight may shift so that one or more air sacks is suddenly supporting significantly greater weight than it was supporting prior to the person's change of position. This sudden increase in the amount of weight supported by the selected air sack causes the pressure of the pressurized fluid inside of the selected air sack to suddenly increase. When using conventional control assemblies, this pressure increase could force pressurized fluid to flow from the selected air sack, through the control assembly associated with the selected air sack, and into the manifold. This "back flow" of pressurized fluid from the selected air sack back into the manifold will change the pressure of pressurized fluid in the interior region of the manifold and will thereby change the pressure of pressurized fluid within each other air sack. Thus, a change of position of the person on top of the mattress can result in each air sack of the mattress being at a pressure that is different from the desired pressure of each air sack.

Each flow control assembly of the control system in accordance with the present invention includes a check valve mounted in the interior region of the control assembly between the inlet control orifice and the manifold to prevent pressurized fluid from flowing from the interior region of the air sack and the interior region of the control assembly to the interior region of the manifold. Including check valves in each control assembly eliminates changes of the pressure of the pressurized fluid in the manifold caused by the back flow of pressurized fluid from the air sacks so that the manifold pressure is a function of only the source of pressurized fluid and is not affected by changes of position of the person on top of the mattress.

When the person on top of the mattress including the control system in accordance with the present invention changes positions so that the pressurized fluid within one of the air sacks is suddenly pressurized to a pressure higher than the desired pressure, the excess pressurized fluid will flow into the control assembly. However, the check valve blocks the flow of pressurized fluid from the control assembly to the manifold so that rather than escaping into both the manifold and the exhaust line, the excess pressurized fluid will escape solely through the exhaust line. Therefore, a sudden increase of the pressure of pressurized fluid within a selected air sack will not result in a change of the pressure of the pressurized fluid within the manifold and will not affect the pressure of the pressurized fluid within the other air sacks.

Each preferred control assembly includes the check valve which is preferably positioned to lie between the inlet control orifice and the manifold so that the pressurized fluid acting against the check valve is at the maximum pressure in the system, this being the pressure of the pressurized fluid found in the interior region of the manifold. However, the check valve can also be positioned to lie between the exhaust line and the inlet control orifice without exceeding the scope of the invention as presently perceived.

In addition, the exhaust line can be in fluid communication with the conduit which is in fluid communication with the interior region of the air sack or the exhaust can be connected directly to the air sack and can be directly in fluid communication with the interior region of the air sack. Thus, it is within the scope of the invention as presently perceived to provide a control assembly having an exhaust line in fluid communication with the interior region of the air sack through the conduit and also having a check valve at any position within the control assembly between the air sack and the manifold but not positioned to lie between the interior region of the air sack and the exhaust line. This placement of the check valve allows pressurized fluid to flow freely from the air sack to the exhaust line while blocking the flow of pressurized fluid from the air sack to the manifold.

The pressure control assembly in accordance with the present invention can be provided having no moving parts and no sensors or feedback loops for monitoring the pressure of pressurized fluid within each air sack. Manufacturers and users alike will appreciate the low cost of the assembly which can be provided to users both in an institutional setting such a hospital or a group care home and to consumers for in-home use. If desired, the pressure control assembly can be provided with a "variable orifice" having a variable size for either or both of the inlet control orifice and the exhaust control orifice so that the pressure of the pressurized fluid in each air sack can be independently adjusted. In addition, the check value can be configured to include the inlet control orifice to further reduce the number of parts of the pressure control assembly.

Additional objects, features, and advantages of the invention will become apparent to those skilled in the art upon consideration of the following detailed description of the preferred embodiment exemplifying the best mode of carrying out the invention as presently perceived.

BRIEF DESCRIPTION OF THE DRAWINGS

The detailed description particularly refers to the accompanying figures in which.

DETAILED DESCRIPTION OF THE DRAWINGS

Figure 1:
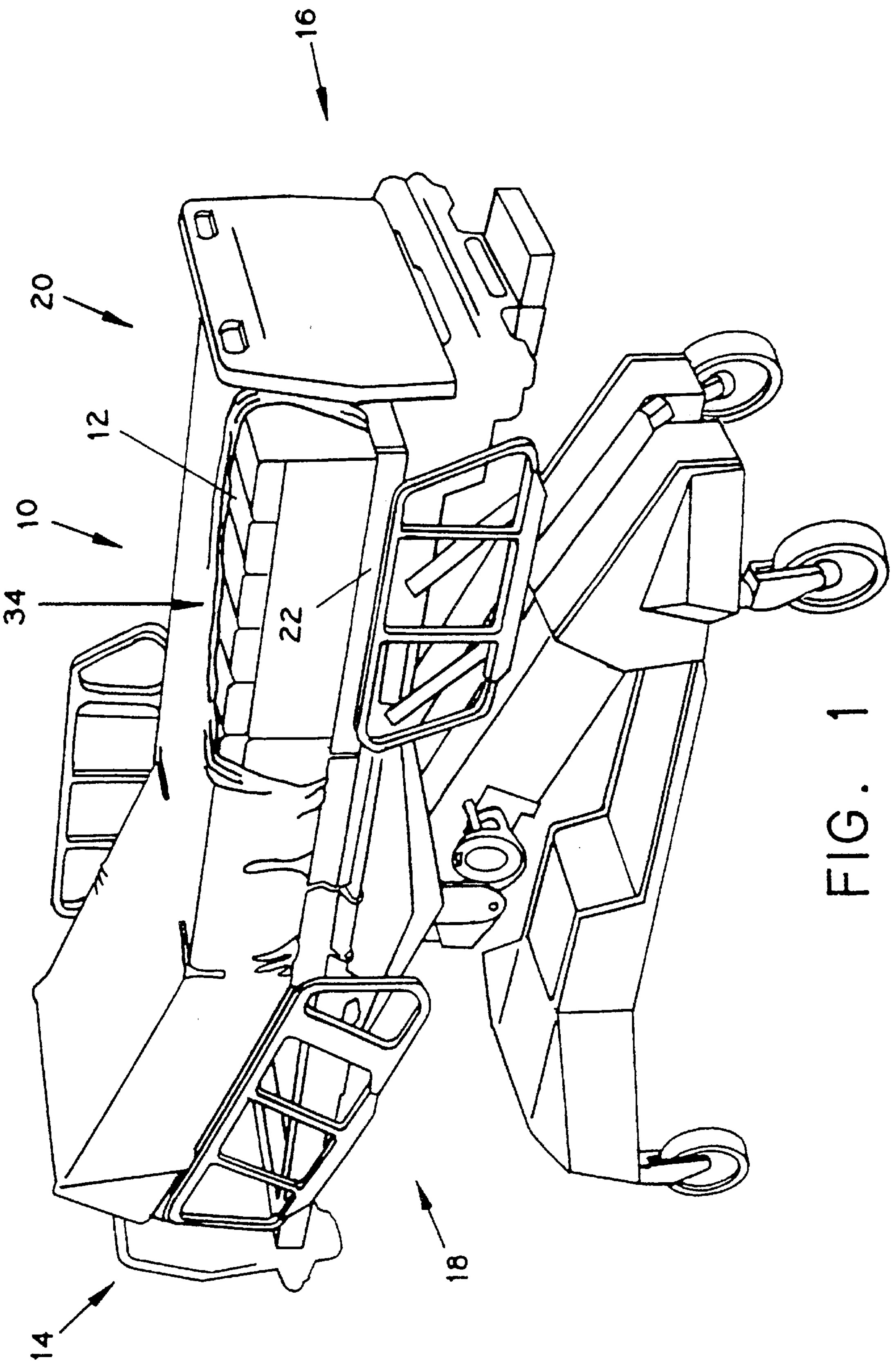
FIG. 1 is a perspective view of a hospital bed having an articulating deck and carrying a mattress, a mattress overlay, or a mattress replacement system (hereinafter mattress) in accordance with the present invention.

An illustrative bed 10 carrying a mattress, a mattress overlay, or a mattress replacement system 12 (hereinafter mattress 12) having a pressure control assembly in accordance with the present invention includes a head end 14, a foot end 16 longitudinally spaced-apart from head end 14, a longitudinally-extending first side 18 therebetween, and a longitudinally-extending second side 20 spaced apart from first side 18 as shown in FIG. 1. Although illustrative bed 10 is a bed for use in a hospital or a group care home, mattress 12 including the pressure control assembly in accordance with the present invention is equally appropriate for use both in an institutional facility and for “in-home” use by consumers.

As used in this description, the phrase “head end 14” will be used to denote the end of any referred-to object that is positioned to lie nearest head end 14 of bed 10 and the phrase “foot end 16” will be used to denote the end of any referred-to object that is positioned to lie nearest to foot end 16 of bed 10. Likewise, the phrase “first side 18” will be used to denote the side of any referred-to object that is positioned to lie nearest the first side 18 of bed 10 and the phrase “second side 20” will be used to denote the side of any referred-to object that is positioned to lie nearest the second side 20 of bed 10.

As described above, bed 10 can be any bed such as a bed for use in a hospital or other care facility, a bed for use in a home, or any other type of bed having an upwardly-facing surface above which a user will rest. Bed 10 includes a bed deck 22 carrying mattress 12 as shown in FIG. 1. Illustrative deck 22 is an articulating deck including longitudinally-spaced sections that are moveable relative to one another. Mattress 12 can be compatible with articulating deck 22 in that mattress 12 can be formed to include longitudinally-spaced sections that are moveable relative to one another and that are moveable with the associated sections of articulating deck 22.

If desired, mattress 12 can be used on a deck (not shown) that does not include articulating sections. If articulation of mattress 12 is desired when mattress 12 is carried by a deck that does not articulate, articulation bladders (not shown) can be placed between mattress 12 and the deck. When the articulation bladders are inflated or deflated, portions of mattress 12 can articulate relative to one another. For example, the inflation of an articulation bladder beneath a section of mattress 12 adjacent to foot end 16 of mattress 12 could cause the section of mattress 12 adjacent to foot end 16 to articulate.

Figure 2:
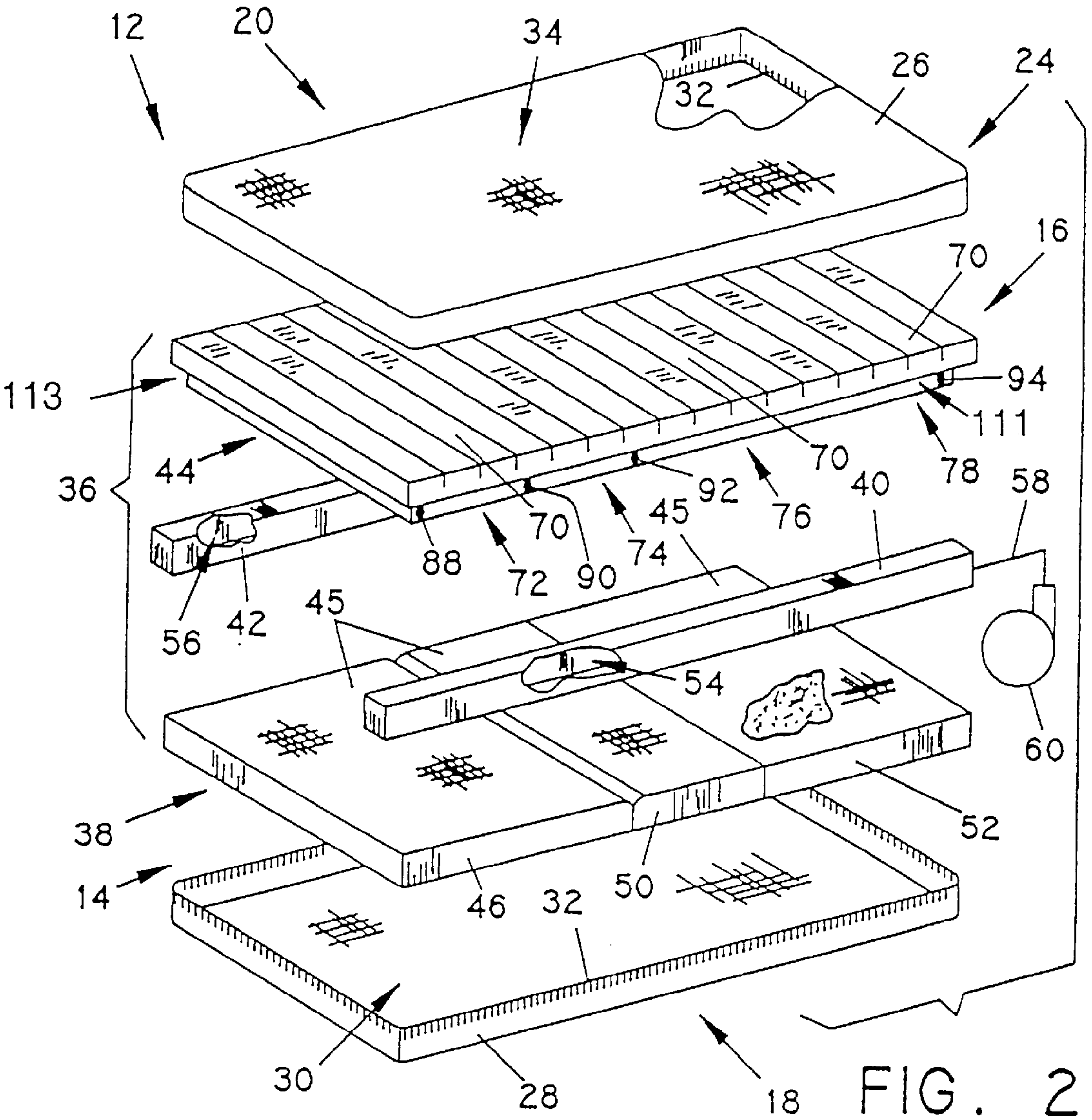
FIG. 2 is an exploded perspective view of a mattress of FIG. 1 showing ticking material forming a mattress cover having an interior region receiving a mattress core including a foam base, longitudinally-extending side members positioned to lie above the foam base, one of the side members defining a manifold in fluid communication with a source of pressurized fluid through a hose connected to the side member, and an air mattress including a plurality of transversely-extending air sacks positioned to lie above the foam base and above the side members, each air sack being independent of each other air sack so that the air sacks are not in fluid communication with one another, each air sack being in fluid communication with the interior region of the manifold of the side member.

Mattress 12 includes a cover 24 having a top cover 26 and a bottom cover 28 connected to top cover 26 by a zipper 32 as shown in FIG. 2. Top cover 26 includes a generally upwardly-facing sleeping surface 34 above which a user will rest. Top and bottom covers 26, 28 of mattress cover 24 cooperate to define an interior region 30 of mattress cover 24. Illustrative and preferred cover 24 is made from material such as P061 material made by Penn Nyla located in Europe. The material of cover 24 is preferably semipermeable allowing air to pass therethrough but sealing mattress 12 against the ingress of moisture. Such ticking material is well-known for use with “low air loss” mattresses of the type described below and disclosed in U.S. Pat. No. 4,919,414 to Thomas et al., the specification of which is hereby incorporated by reference.

Interior region 30 of mattress cover 24 receives a mattress core 36 as shown in FIG. 2. Mattress core 36 includes a foam base 38, a longitudinally-extending first side member 40 positioned to lie above foam base 38 and adjacent to first side 18 of foam base 38, a longitudinally-extending second side member 42 positioned to lie above foam base 38 adjacent to second side 20 of foam base 38, and an air mattress 44 positioned to lie above foam base 38 and above first and second side members 40, 42 as shown in FIG. 2. Mattress cover 24 holds the elements of mattress core 36 together and provides an interface between mattress 12 and the person supported by mattress 12.

Foam base 38 is made from a plurality of longitudinally-spaced base sections 45 including a head section 46 adjacent to head end 14 of mattress 12, a seat section 50 adjacent to head section 46, and a leg section 52 adjacent to seat section 50 and adjacent to foot end 16 of mattress 12 as shown in FIG. 2. Foam base 38 is preferably made from foam rubber such as polyurethane foam which is well known and commonly used for producing foam mattresses. Each illustrative and preferred base section 45 is covered by medical grade staff-check ticking such as the ticking material from which mattress cover 24 is made. Preferably, the ticking material covering base sections 45 is Staff Check XL material made by Herculite.

Preferred first and second side members 40, 42 are elongated air bladders defining interior regions 54, 56, respectively, as shown in FIG. 2. First and second side members 40, 42 are preferably made from urethane having polyester knit reinforcement. Side members 40, 42 are inelastic so that when side members 40, 42 are inflated they provide rigid supports along first and second sides 18, 20 of mattress 12.

In preferred embodiments, a conduit 58 connects first side member 40 to a source of pressurized fluid 60 as shown diagrammatically in FIG. 2 so that interior region 54 of first side member 40 is in fluid communication with a source of pressurized fluid 60. Also in preferred embodiments, a second conduit (not shown) connects second side member 42 to first side member 40 so that interior region 56 of second side member 42 is in fluid communication with interior region 54 of first side member 40. Thus, in preferred embodiments, interior region 54 of first side member 40 and interior region 56 of second side member 42 are each in fluid communication with source of pressurized fluid 60 and each contains pressurized fluid that is pressurized to substantially the same pressure in each interior region 54, 56.

The pressurized fluid is preferably pressurized air and source of pressurized fluid 60 is preferably an air blower or an air compressor. In preferred embodiments, a pressure transducer 62 is in fluid communication with interior region 54 of first side member 40 and is coupled to a controller 64 so that pressure transducer 62 provides a pressure input signal to controller 64 as shown diagrammatically in FIG. 5. Controller 64 controls the operation of source of pressurized fluid 60 that preferably operates over a range of desired supply pressures. For example, if source of pressurized fluid 60 is a blower, the pressure of the pressurized fluid can be varied by varying the speed of the blower and the speed of the blower can be varied by varying the voltage supplied to the blower. Controller 64 controls the voltage supplied to the blower in response to the pressure input signal in order to maintain the pressure of the pressurized fluid in interior region 54 of first side member 40 at a desired pressure.

Although the preferred pressurized fluid is air, the pressure control assembly for the air mattress air system described herein will operate as described when the pressurized fluid is nitrogen or any other generally inert gas. Thus, it is within the scope of the invention as presently perceived to provide a pressure control assembly for an air mattress overlay air system for use with any suitable generally inert gas. In addition, although the preferred source of pressurized fluid 60 is a blower, source of pressurized fluid 60 can be a container or tank containing pressurized fluid, a "house" gas line containing pressurized fluid, or any other suitable source of pressurized fluid without exceeding the scope of the invention as presently perceived.

Mattress core 36 of mattress overlay 12 additionally includes air mattress 44 which has a plurality of longitudinally-spaced apart and transversely-extending air sacks 70 as shown in FIG. 2. Air mattress 44 provides mattress overlay with firmness and support characteristics that can be varied by varying the pressure of the pressurized fluid in the interior regions of each air sack 70. Preferably, air mattress 44 includes four air sacks 70, although there is no theoretical limit to the number of air sacks 70 that can be included with air mattress 44 of mattress overlay 12 and controlled by a control assembly in accordance with the present invention. In addition, although air sacks 70 of air mattress 44 are longitudinally spaced apart and extend transversely, the shapes and relative positioning of air sacks 70 can be varied without exceeding the scope of the invention as presently perceived.

Preferred air mattress 44 includes a head section air sack 72 adjacent to head end 14 of bed 10 and positioned to lie above head section 46 of foam base 38, a back section air sack 74 adjacent to head section air sack 72 and positioned to lie above head section 46 of foam base 38, a seat section air sack 76 adjacent to back section air sack 74 and positioned to lie above seat section 50 and leg section 52 of foam base 38, and a leg section air sack 78 positioned to lie adjacent to seat section air sack 76 and positioned to lie above leg section 52 of foam base 38 and adjacent to foot end 16 of bed 10.

Figure 3:
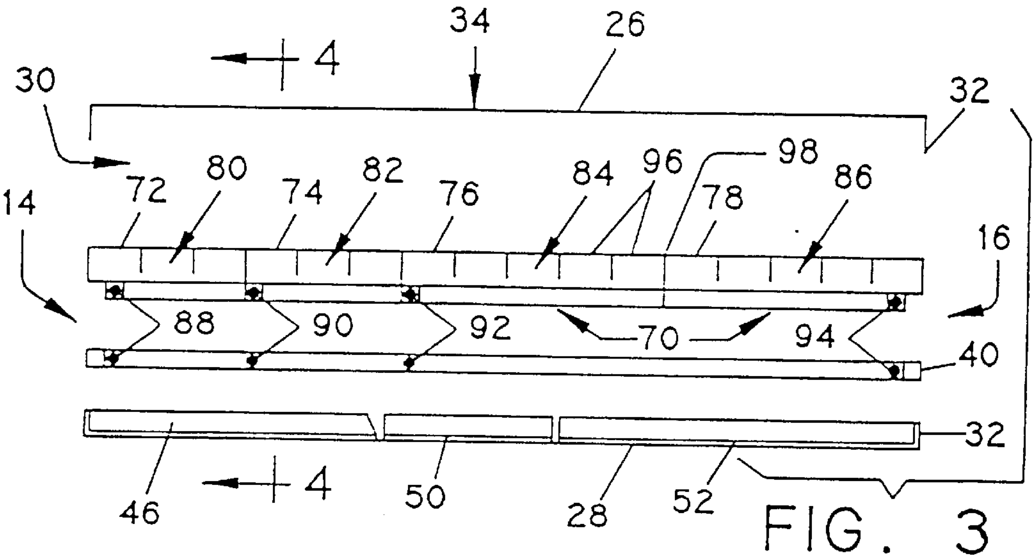
FIG. 3 is an exploded side elevation view of the mattress of FIG. 2 showing the mattress core including three longitudinally spaced sections of the foam base received in a bottom cover of the mattress cover, one of the side members positioned to lie above the foam base, the air mattress being positioned to lie above the foam base and above the side member, and a top cover of the mattress cover cooperating with the bottom cover of the mattress cover to define an interior region receiving the mattress core.
Figure 5:
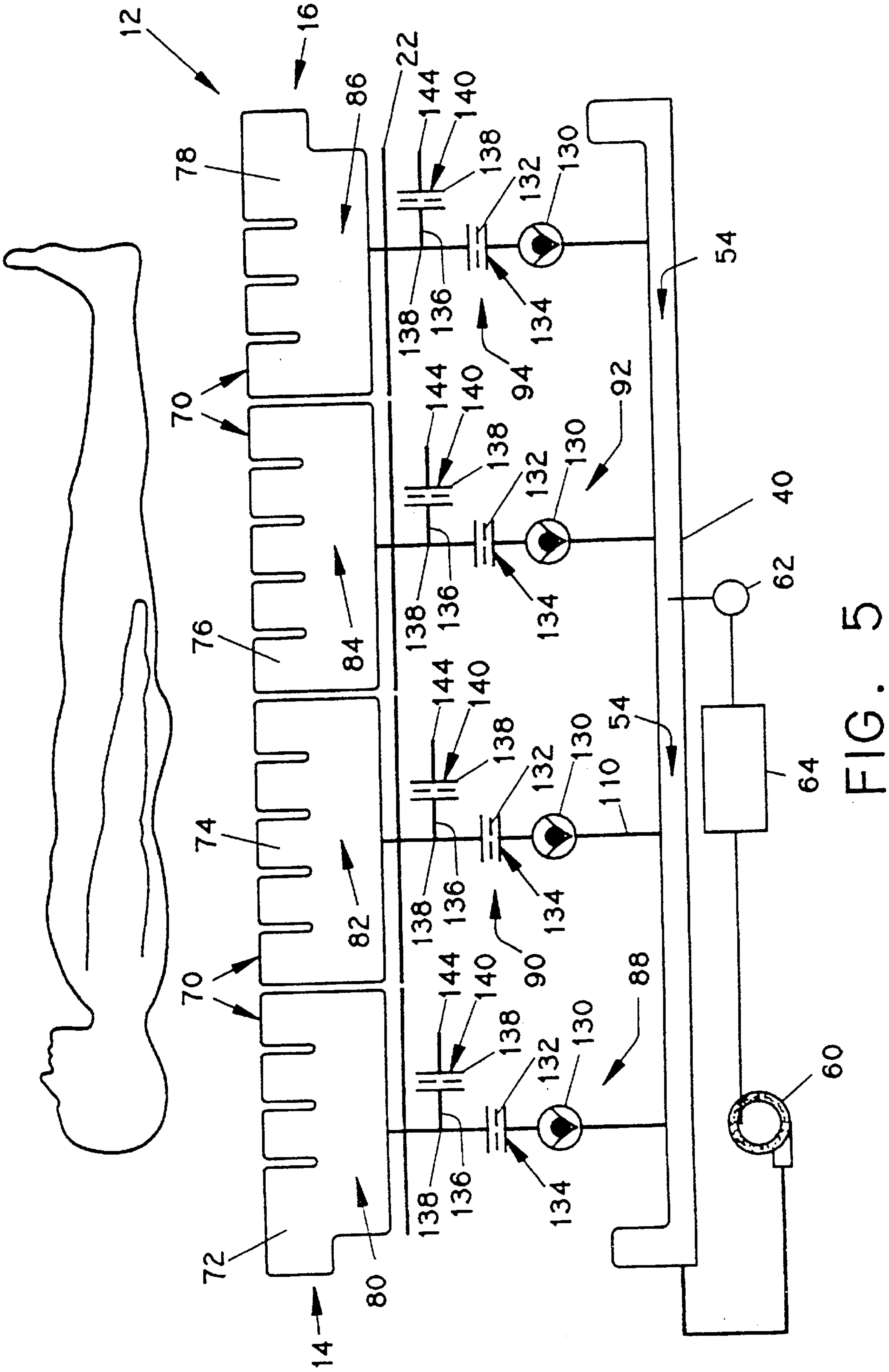
FIG. 5 is a diagrammatic view of the mattress of FIG. 3 and the pressure control system in accordance with the present invention showing four longitudinally spaced-apart and independent air sacks supporting a person, a conduit connecting each air sack to a manifold in fluid communication with a source of pressurized fluid, an inlet control orifice mounted in each conduit between the manifold and each air sack, an exhaust line mounted in each conduit and in fluid communication with each air sack, an exhaust control orifice mounted in the exhaust line, and a check valve mounted in each conduit and positioned to lie between the air sack and the manifold, the check valve and exhaust line being configured so that the check valve does not interfere with the flow of pressurized fluid from the air sack to the exhaust line.
Figure 6:
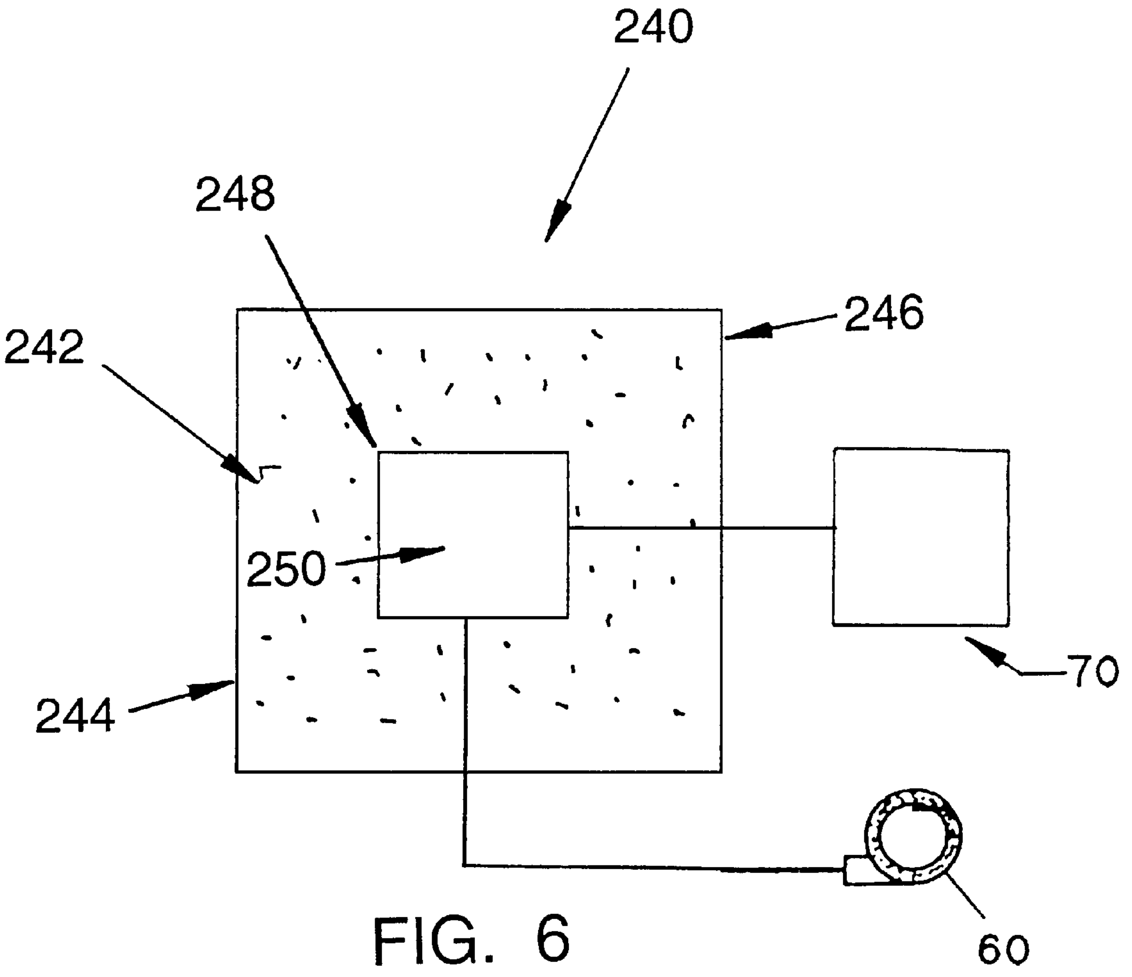
FIG. 6 is a diagrammatic view of an alternative embodiment side member have a foam core surrounding a manifold, and ticking material receiving the foam core.

Head, back, seat, and leg section air sacks 72, 74, 76, 78 define interior regions 80, 82, 84, 86, respectively, as shown in FIGS. 3 and 5. Interior regions 80, 82, 84, 86 are in fluid communication with interior region 54 of first side member 40 through control assemblies 88, 90, 92, 94, respectively.

Each preferred air sack 70 is generally rectangular in shape when inflated and includes webbing defining a plurality of transversely-extending tubes 96 as shown in FIGS. 1–5. In addition, each air sack 70 may include a plurality of pin holes or openings (not shown), to allow a small amount of air to bleed from each air sack 70 so that preferred mattress 12 is of the type known generally as a "low air loss" mattress. The diameters of the holes of low air loss mattresses are preferably about 20–40 thousandths of an inch (0.5–1.0 mm), but can be in the range of between 10 to 90 thousandths of an inch (0.25–2.3 mm). However, the sizes of the openings can extend beyond the range of sizes typically found in low air loss mattresses without exceeding the scope of the invention as presently perceived. The holes are preferably positioned to lie adjacent to the top surface of each air sack 70 so that a small amount of air can escape from each air sack 70 to warm or cool the person lying on sleeping surface 34 and to reduce maceration.

As described above, each air sack 70 includes webbing 98 which is preferably formed to define a plurality of transversely-extending tubes 96 as shown best in FIG. 3. Preferably, webs 98 are integral with the outside walls of each air sack 70 and are joined in air tight engagement therewith. Thus, each air sack 70 is independent of each other air sack 70 and can be independently inflated or deflated relative thereto.

Figure 4:
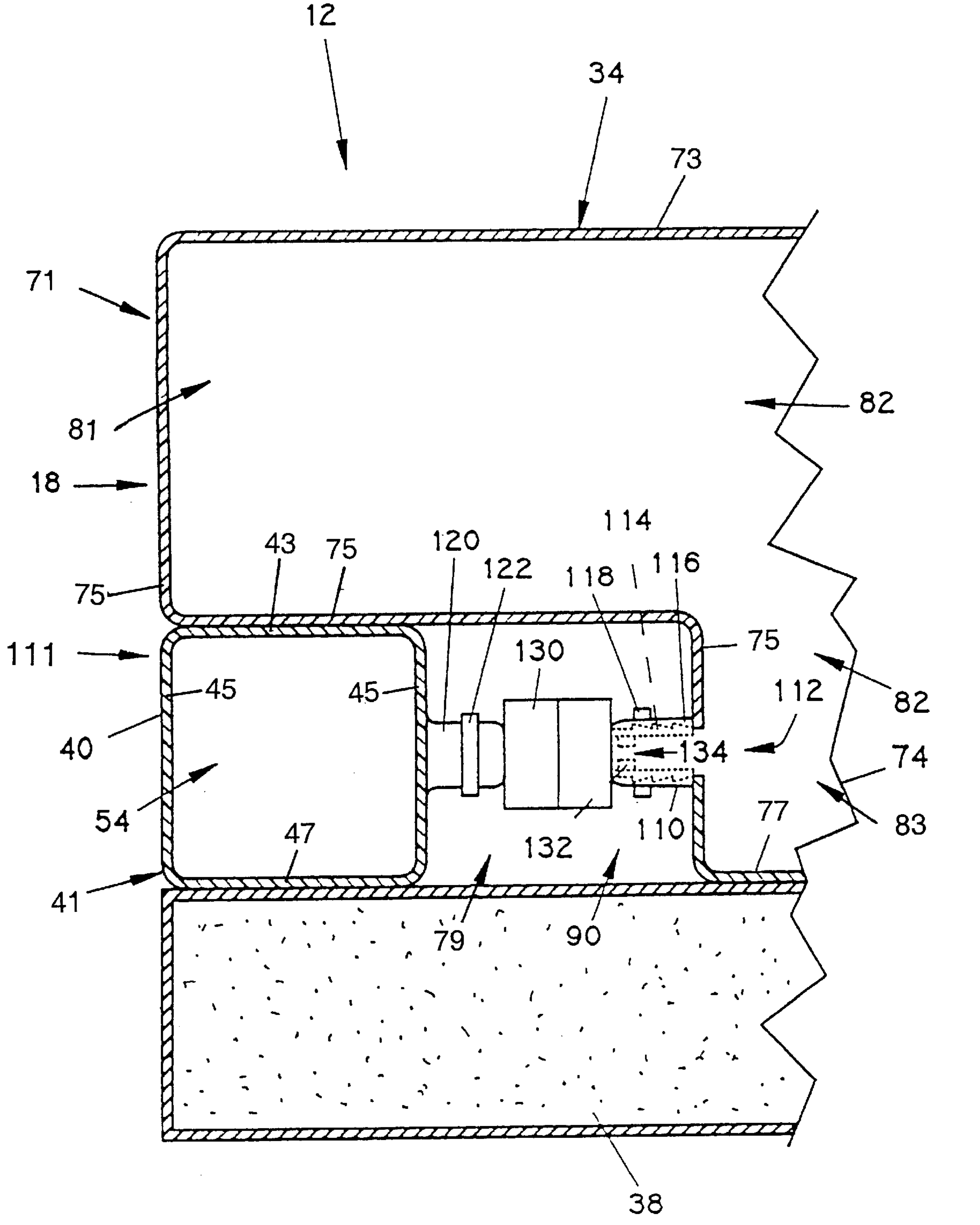
FIG. 4 is a sectional view taken along line 4—4 of FIG. 3 showing the foam base positioned to lie beneath one of the side members and the air mattress positioned to lie on top of the foam base and on top of the side member, the side member being formed to include a manifold in fluid communication with an air sack of the air bladder through a flow control assembly.

As described above, interior regions 80, 82, 84, 86 of air sacks 70 are connected to interior region 54 of first side member 40 through control assemblies 88, 90, 92, 94, respectively, as shown in FIGS. 3–5. It can be seen that pressurized fluid flows from source of pressurized fluid 60 through conduit 58 to interior region 54 of first side member 40. The pressurized fluid then flows from interior region 54 of first side member 40 to interior region 56 of second side member 42 through a second conduit (not shown). Pressurized fluid also flows from interior region 54 of first side member 40 simultaneously through control assembly 88 to interior region 80 of head section air sack 72, through control assembly 90 to interior region 82 of back section air sack 74, through control assembly 92 to interior region 84 of seat section air sack 76, and through control assembly 94 to interior region 86 of leg section air sack 78. Thus, first side member 40 operates as a manifold to distribute pressurized fluid from source of pressurized fluid 60 to second side member 42 and air sacks 70.

Although second side member 42 is a bladder having interior region 56 in fluid communication with source of pressurized fluid 60 through interior region 54 of first side member 40, the primary purpose of second side member 42 is to provide additional support for a person on sleeping surface 34 of mattress 12. First side member 40 also performs this support function. First and second side members 40, 42 both extend longitudinally and are spaced-apart and positioned to lie adjacent to first side 18 and second side 20 of mattress 12, respectively, as shown best in FIG. 2. Air sacks 70 are formed to include notched portions 111, 113. As shown in FIG. 4, each air sack 70 includes an outer wall 71 having a top portion 73, side portions 75, and a bottom portion 77 that cooperate to define interior regions 80, 82, 84, 86 of air sacks 70 having an upper portion 81 and a lower portion 83. Side portions 75 define notched portions 111, 113 that cooperate to define a pair of channels 79 configured to receive first and second side members 40, 42 as shown in FIGS. 2 and 4. Foam base 38 also cooperates to define a portion of U-shaped channels 79. Manifold 40 includes an outer wall 41 having a top portion 43, side portions 45, and a bottom portion 47 that cooperate to define interior region 54. In preferred embodiments, the pressurized fluid within interior regions 54, 56 of first and second side members 40, 42 is at a higher pressure than pressurized fluid within interior regions 80, 82, 84, 86 of air sacks 70. In addition, first and second side members 40, 42 are configured so that mattress 12 is firmer adjacent to first and second side members 40, 42 than adjacent to other portions of sleeping surface 34. In addition, in preferred embodiments, first and second side members 40, 42 are configured so that sleeping surface 34 is slightly "humped" adjacent to each of first and second side members 40, 42 to assist in preventing the person resting on sleeping surface 34 from inadvertently falling from sleeping surface 34. Finally, having additional firmness adjacent to first and second sides 18, 20 of mattress 12 assists a person when entering or exiting sleeping surface 34.

Although preferred first and second side members 40, 42 are air bladders containing pressurized fluid, first and second side members can be made from other materials without exceeding the scope of the invention as presently perceived. For example, first and second side members 40, 42 can be made from foam rubber or silicone providing an indention load deflection (ILD) or firmness that is greater than the ILDs of air sacks 70 when air sacks 70 are filled with pressurized fluid. However, if side member 40 is not an air bladder, a separate manifold must be provided to bring air sacks 70 into fluid communication with source of pressurized fluid 60.

In such instance, a separate manifold could be carried by first side member 40 if desired. For example, a first side member 240 could include a foam rubber or silicone core 242 that is covered by ticking material 244 defining an interior region 246 receiving the core 242. The manifold 248 could also be received in the interior region 246 of the ticking material 244 and preferably could be surrounded by the core 242. Thus, for the remainder of this description, the term "manifold 40" will be used to denote either first side member 40 including an air bladder having interior region 54 in fluid communication with source of pressurized fluid 60 or first side member 40 including separate manifold 248 having an interior region 250 in fluid communication with source of pressurized fluid 60.

As described above, interior regions 80, 82, 84, 86 of air sacks 70 are brought into fluid communication with interior region 54 of manifold 40 by control assemblies 88, 90, 92, 94, respectively, as shown in FIGS. 3–5. Illustrative and preferred control assemblies 88, 90, 92, 94 are substantially similar to one another and the description below of control assembly 90 is also descriptive of control assembles 88, 92, 94. Thus, unless otherwise specified, the description below of control assembly 90 is to be taken as also being a description of control assemblies 88, 92, 94.

Illustrative control assembly 90 includes a conduit 110 connecting manifold 40 to back section air sack 74 as shown in FIGS. 4 and 5. Conduit 110 includes an interior region 112 in fluid communication with interior region 82 of back section air sack 74 and in fluid communication with interior region 54 of manifold 40 so that interior region 82 of back section air sack 74 is in fluid communication with interior region 54 of manifold 40 through conduit 110.

Conduit 110 of illustrative and preferred mattress 12 includes a nipple 114 received by a tube 116 that is integral with back section air sack 74 as shown in FIG. 4. Nipple 114 is retained in tube 116 by a hose clamp 118 encircling tube 116 adjacent to nipple 114 and pressing tube 116 against nipple 114 to form a generally air tight seal therebetween. In addition, conduit 110 includes a nipple (not shown) received in tube 120 that is integrally appended to manifold 40 and that is retained therein by a hose clamp 122 to form a generally air tight seal therebetween.

Control assembly 90 includes an annular inlet plate 132 defining an inlet control orifice 134 illustratively received by conduit 110 adjacent to tube 116 as shown in FIGS. 4 and 5. Annular inlet plate 132 and inlet control orifice 134 restrict the flow of pressurized fluid between manifold 40 and back section air sack 74. When the pressure of the pressurized fluid in interior region 54 of manifold 40, the pressure of pressurized fluid in interior region 82 of back section air sack 74, and the size of inlet control orifice 134 are constant and the pressure of the pressurized fluid in interior region 54 of manifold 40 is greater than the pressure of the pressurized fluid in interior region 82 of back section air sack 74, then the flow of pressurized fluid from manifold 40 to back section air sack 74 through inlet control orifice 134 is also constant.

It should be noted that although preferred inlet control orifice 134 is formed in annular inlet plate 132, inlet control orifice 134 can be formed in any object that will restrict the flow of pressurized fluid between interior region 54 of manifold 40 and interior region 82 of back section air sack 74 and thus cause a resultant change in pressure therebetween. For example, conduit 110 could be sized having a selected inner diameter so that conduit 110 itself is formed to include inlet control orifice 134 and to restrict the flow of pressurized fluid between interior region 54 of manifold 40 and interior region 82 of back section air sack 74. Likewise, tube 116 of back section air sack 74 or tube 120 of manifold 40 can be formed to include inlet control orifice 134 and restrict the flow of pressurized fluid between interior region 54 of manifold 40 and interior region 82 of back section air sack 74, without exceeding the scope of the invention as presently perceived.

A check valve 130 is received in conduit 110 and is positioned to lie between interior region 54 of manifold 40 and interior region 82 of back section air sack 74 as shown in FIGS. 4 and 5. Check valve 130 operates to permit the flow of pressurized fluid from interior region 54 of manifold 40 to interior region 82 of back section air sack 74 while blocking the flow of pressurized fluid in the opposite direction from interior region 82 of back section air sack 74 to interior region 54 of manifold 40. Thus, pressurized fluid can flow from interior region 54 of manifold 40 to interior region 82 of back section air sack 74 when the pressure of the pressurized fluid in interior region 54 of manifold 40 is greater than the pressure of pressurized fluid in interior region 82 of back section air sack 74. However, when the pressure of the pressurized fluid in interior region 82 of back section air sack 74 is greater than the pressure of pressurized fluid in interior region 54 of manifold 40, check valve 130 blocks the flow of pressurized fluid from interior region 82 of back section air sack 74 to interior region 54 of manifold 40. In illustrative and preferred conduit 110, nipple 114 in tube 116 and the nipple (not shown) in tube 120 are each attached to check valve 130.

Illustrative and preferred check valve 130 is a model number 306 PPB-3 check valve made by Smart Products, Inc. of San Jose, Calif. It should be noted that, if desired, check valve 130 can be sized to restrict the flow of pressurized fluid between interior region 54 of manifold 40 and interior region 82 of back section air sack 74 without exceeding the scope of the invention as presently perceived so that check valve 130 operates as annular plate 132 and inlet control orifice 134.

Control assembly 90 additionally includes an exhaust line 136 in fluid communication with interior region 82 of back section air sack 74 as shown diagrammatically in FIG. 5. Exhaust line 136 is illustratively coupled to back section air sack 74 through conduit 110. When exhaust line 136 is coupled to back section air sack 74 through conduit 110 it is important that the intersection 138 of exhaust line 136 and conduit 110 is positioned to lie between back section air sack 74 and check valve 130. This configuration will ensure that pressurized fluid from back section air sack 74 can flow freely from interior region 82 of back section air sack 74 though conduit 110 to exhaust line 136 without interference from check value 130.

Although exhaust line 136 is illustratively in fluid communication with interior region 82 of back section air sack 74 through conduit 110 as shown diagrammatically in FIG. 5, exhaust line 136 can also be connected directly to back section air sack 74 so that exhaust line 136 is directly in communication with interior region 82 of back section air sack 74. If desired, when exhaust line 136 is connected directly to back section air sack 74, exhaust line can be merely an aperture formed in back section air sack 74 and in fluid communication with interior region 82 of back section air sack 74 so that pressurized fluid can escape from interior region 82 through the aperture. In addition, when exhaust line 136 is merely an aperture formed in air sack 74, the aperture can instead include the plurality of openings (not shown) described above with respect to the low air loss-type mattress so that pressurized fluid escapes from interior region 82 of back section air sack 74 through all of the openings.

It is therefore within the scope of the invention as presently perceived to couple exhaust line 136 directly to back section air sack 74, to bring exhaust line 136 into fluid communication with interior region 82 of back section air sack 74 through conduit 110, or to form exhaust line 136 by simply forming one aperture or a plurality of air-loss apertures in back section air sack 74, each of which is in fluid communication with interior region 82 of back section air sack 74. Thus, exhaust line 136 can be brought into fluid communication with interior region 82 of back section air sack 74 through any suitable conduit or other implement for communicating the pressurized fluid to exhaust line 136 or for exhausting the pressurized fluid so long as the pressurized fluid can freely flow from interior region 82 of back section air sack 74 to exhaust line 136, without exceeding the scope of the invention as presently perceived.

An annular exhaust plate 138 defining an exhaust control orifice 140 is illustratively received in exhaust line 136 as shown diagrammatically in FIG. 5. Annular exhaust plate 138 and exhaust control orifice 140 restrict the flow of pressurized fluid from interior region 82 of back section air sack 74 through exhaust line 136. In preferred embodiments, exhaust line 136 includes a first end at intersection 138 of exhaust line 136 and conduit 110 and a second end 144 that is preferably in fluid communication with the atmosphere. Annular exhaust plate 138 is positioned to lie between intersection 138 and second end 144. Thus, annular exhaust plate 138 restricts the flow of pressurized fluid through exhaust control orifice 142 from interior region 82 of back section air sack 74 through intersection 138, exhaust line 136, and second end 144 of exhaust line 136 to the atmosphere.

It will also be understood by those skilled in the art that in embodiments, described above, having exhaust line 136 that is merely exhaust control orifice 142 formed in back section air sack 74, the flow of pressurized fluid from interior region 82 of back section air sack 74 to the atmosphere is restricted as the pressurized fluid passes through exhaust control orifice 142. In addition, when the exhaust is provided by the plurality of openings of the low air loss-type mattress, it is important that the number and average size of the openings are controlled because all of the openings cooperate to form an effective exhaust control orifice 140. The cross-sectional areas of all of the openings define an equivalent cross-sectional area of the effective exhaust control orifice 140 and the flow of pressurized fluid from interior region 82 of back section air sack 74 to the atmosphere is the sum of the flow of pressurized fluid through all of the openings. In each embodiment, so long as the pressure of the pressurized fluid in interior region 82 of back section air sack 74 is constant relative to atmospheric pressure and the size of exhaust control orifice 142 is constant, then the flow of pressurized fluid from interior region 82 of back section air sack 74 to the atmosphere through exhaust control orifice 142 will be generally constant.

The mass flow rate of a non-compressible fluid through an opening in a pipe is governed by the following equation:

$$\dot{m}_{actual}=KA_t\cdot\sqrt{2\rho(p_{1-p2)}} \quad (1)$$

where $\dot{m}_{actual}$=Mass flow rate through the opening;

K=Flow coefficient;

$\rho$=Density of the pressurized fluid;

$A_t$=Cross-sectional area of the opening;

$p_1$=Pressure upstream of the opening; and $p_2$=Pressure downstream of the opening.

K is essentially constant for gas flow having a large Reynolds Number ($Re>2\times10^5$) upstream of the orifice. While the preferred pressurized fluid is air and air is not a non-compressible fluid, equation (1) and the following equations closely approximate the behavior of air within the range of pressures typically of interest for use in air mattresses, at which air generally behaves in a manner similar to a non-compressible fluid.

If the composition of the pressurized fluid remains constant and the cross-sectional area of the orifice remains constant, then the above relationship of equation (1) can be simplified to:

$$\dot{m}_{actual}=\text{Constant}\cdot\sqrt{(p_{1-p2)}} \quad (2)$$

or $$\Delta p=\text{Constant}\cdot(\dot{m}_{actual})^2 \quad (3)$$

Thus, by having flow through an orifice, the pressure differential across the orifice is proportional to the square of the mass flow rate through the orifice.

According to the above-noted relationship, when the composition of the pressurized fluid is generally constant, the pressure upstream of the opening in the pipe is generally constant and the pressure downstream of the opening in the pipe is generally constant, then:

$$\dot{m}_{actual}=\text{Constant}\cdot A_t \quad (4)$$

Thus, under these conditions, the mass flow rate through the opening in the pipe is proportional to the size of the area of the opening of the orifice.

As described above, pressurized fluid is provided to interior region 54 of manifold 40 by source of pressurized fluid 60. Pressurized fluid flows from interior region 54 of manifold 40 to interior regions 80, 82, 84, 86 of the head, back, seat, and leg sections 72, 74, 76, 78, respectively, through control assemblies 88, 90, 92, 94, respectively, as shown diagrammatically in FIG. 5. Each control assembly 88, 90, 92, 94 includes a check valve 130 preventing the flow of pressurized fluid from each air sack 70 through its respective control assembly 88, 90, 92, 94 to interior region 54 of manifold 40. Each control assembly 88, 90, 92, 94 also includes an annular inlet plate 132 restricting the flow of pressurized fluid from interior region 54 of manifold 40 through inlet control orifice 134 of annular inlet plate 132 to the interior region of its respective air sack 70.

Each air sack 70 also includes an exhaust line 136 allowing pressurized fluid to escape from the interior region of each respective air sack 70 and annular exhaust plate 138 restricting the flow of pressurized fluid from the interior region of each respective air sack 70 through exhaust control orifice 142 of annular exhaust plate 138 to the atmosphere. The total flow of pressurized fluid out of all of the exhaust lines 136 is typically 3–5 cfm (85–145 lpm). Preferred source of pressurized fluid 60 should be capable of supplying pressurized fluid at this mass flow rate and at a pressure of up to approximately 22 inches of water (495 nt/$m^2$).

It will be understood by those skilled in the art that equation (1) shows that the mass flow rate of pressurized fluid from interior region 54 of manifold 40 to the interior region of each air sack 70 is determined by factors including the pressure of pressurized fluid in interior region 54 of manifold 40, the pressure of pressurized fluid in the interior region of each air sack 70, and the size of inlet control orifice 134. Likewise, the mass flow rate of pressurized fluid from the interior region of each air sack 70 to the atmosphere is determined by the atmospheric pressure, which is the reference pressure for the other pressure measurements of the pressure control system, the pressure of the pressurized fluid in the interior region of each air sack 70, and the size of each exhaust control orifice 142.

It will be appreciated by those skilled in the art that an air system including control assemblies such as those described herein starting from an initial condition having no pressurized fluid flowing from source of pressurized fluid 60 to manifold 40 will experience a transition period once pressurized fluid is allowed to flow to interior region 54 of manifold 40 and before reaching steady state. During the transition period, the mass flow rates through the control orifices 134, 142 will vary and the pressures of pressurized fluid in interior region 54 of manifold 40 and the interior regions of air sacks 70 will vary. However, steady state will be quickly reached so that the pressure of pressurized fluid in interior region 54 of manifold 40 is constant, the respective mass flow rates of pressurized fluid from manifold 40 to each air sack 70 through each respective inlet control orifice 134 is constant, the pressure of pressurized fluid in the interior region of each air sack 70 is constant, and the mass flow rate of pressurized fluid exhausted from each air sack 70 through each respective exhaust control orifice 142 is constant.

When the pressure of pressurized fluid in interior region 54 of manifold 40 is constant, the pressure of the pressurized fluid in the interior region of each air sack 70 can be adjusted by adjusting the mass flow rate of pressurized fluid through inlet control orifice 134 and exhaust control orifice 142 by adjusting either the size of inlet control orifice 134 or the size of exhaust control orifice 142 as shown by equation (4), above. For example, increasing the size of inlet control orifice 134 will increase the mass flow rate of pressurized fluid from interior region 54 of manifold 40 to the interior region of the affected air sack 70 so that the pressure of the pressurized fluid in the interior region of the affected air sack 70 will increase until steady state is reached at a higher pressure and with a higher mass flow rate through both inlet control orifice 134 and exhaust control orifice 142. For another example, increasing the size of exhaust control orifice 142 will increase the mass flow rate of the pressurized fluid from the interior region of the affected air sack 70 to the atmosphere so that the pressure of the pressurized fluid in the interior region of the affected air sack 70 will decrease until steady state is reached at a lower pressure and with a higher mass flow rate through both inlet control orifice 134 and exhaust control orifice 142.

Thus, the pressure of the pressurized fluid in each air sack 70 can be different from the pressure of the pressurized fluid in each other air sack 70. In addition, the pressure of pressurized fluid in each air sack 70 can be individually controlled by maintaining the pressure of the pressurized fluid in interior region 54 of manifold 40 at a constant pressure and by selecting the size of inlet control orifice 134 and exhaust control orifice 142 associated with the respective control assembly of each respective air sack 70 so that the pressure of the pressurized fluid in the interior region of each air sack 70 is at a desired pressure. Of course, it will be understood by those skilled in the art that the pressure of pressurized fluid in each air sack 70 can be adjusted by simply adjusting the pressure of pressurized fluid in manifold 40, however adjustment of the manifold pressure alone while the sizes of inlet control orifice 134 and exhaust control orifice 142 are fixed will not allow for independent adjustment of the pressure of pressurized fluid in each air sack 70, independent of each other air sack 70.

Using Equation (2) above for manifold 40 and head section air sack 72 it can be seen that:

$$\dot{m}_{head}=C_{inlet}\cdot\sqrt{(p_{manifold}-p_{head})} \quad (5)$$

and $$\dot{m}_{head}=C_{exhaust}\cdot\sqrt{(p_{head}-p_{atm})} \quad (6)$$

where $\dot{m}$hd head=Mass flow rate through inlet and exhaust control orifices 134, 142;

$C_{inlet}$=Constant for inlet control orifice 134, which equals $KA_{tinlet}$ where K is the flow coefficient and $A_{tinlet}$ is the cross-sectional area of inlet control orifice 134;

$C_{exhaust}$=Constant for the exhaust control orifice 142 which equals $KA_{texhaust}$ where K is the flow coefficient and $A_{texhaust}$ is the cross-sectional area of exhaust control orifice 142;

$p_{manifold}$=Pressure of pressurized fluid in interior region 54 of manifold 40;

$p_{head}$=Pressure of pressurized fluid in interior region 80 of head section air sack 72; and $p_{atm}$=Atmospheric pressure=0 (gage pressure).

The above equations can be combined to show that:

$$C_{inlet} \cdot \sqrt{(p_{manifold} - p_{head})} = C_{exhaust} \cdot \sqrt{(p_{head})} \quad (7)$$

and $$p_{head} = \frac{C_{inlet1}^2 \cdot p_{manifold}}{C_{inlet1}^2 + C_{exhaust1}^2} \quad (8)$$

It can be seen, then, that the pressure of the pressurized fluid in interior region 80 of head section air sack 72 is proportional to the pressure of the pressurized fluid in interior region 54 of manifold 40. Also, by varying $C_{inlet}$ and $C_{exhaust}$, which can be varied by varying the cross sectional areas $A_{tinlet}$ and $A_{texhaust}$ of each respective orifice 134, 142, the pressure of the pressurized fluid in interior region 80 of head section air sack 72 can also be adjusted.

Similar equations can be written for each of the back, seat, and leg section air sacks 74, 76, 78:

$$p_{back} = \frac{C_{inlet2}^2 \cdot p_{manifold}}{C_{inlet2}^2 + C_{exhaust2}^2} \quad (9)$$

$$p_{seat} = \frac{C_{inlet3}^2 \cdot p_{manifold}}{C_{inlet3}^2 + C_{exhaust3}^2} \quad (10)$$

$$p_{foot} = \frac{C_{inlet4}^2 \cdot p_{manifold}}{C_{inlet4}^2 + C_{exhaust4}^2} \quad (11)$$

where $p_{manifold}$=Pressure of pressurized fluid in interior region 54 of manifold 40;

$p_{back}$=Pressure of pressurized fluid in interior region 82 of back section air sack 74;

$p_{seat}$=Pressure of pressurized fluid in interior region 84 of seat section air sack 76; and $p_{foot}$=Pressure of pressurized fluid in interior region 86 of leg section air sack 78.

Thus, it can be seen that so long as $p_{manifold}$, the pressure of pressurized fluid in interior region 54 of manifold 40, remains constant and the size of each inlet control orifice 134 and each exhaust control orifice 142 remains constant, then the pressure of pressurized fluid in interior regions 80, 82, 84, 86 of head, back, seat, and leg section air sacks 72, 74, 76, 78 will remain constant. In addition, it can be seen that the pressure of pressurized fluid in interior regions 80, 82, 84, 86 of air sacks 70 can be varied by varying the sizes of inlet control orifices 134, 142.

However, if the pressure of the pressurized fluid in the interior region of one air sack 70, for example back section air sack 74, suddenly changes such as when a person supported on top of back section air sack 74 moves and redistributes their weight, the above described system will no longer be at steady state. If control assembly 90 did not include check valve 130, then pressurized fluid from interior region 82 of back section air sack 74 could flow from interior region 82, through conduit 110, to interior region 54 of manifold 40. This flow of the pressurized fluid would cause the pressure of pressurized fluid in interior region 54 manifold 40 to increase, which in turn, as shown by equations (8), (10), and (11), would cause the pressure of pressurized fluid in each interior region 80, 84, 86 of head, seat, and leg section air sacks 72, 76, 78, respectively, also to increase. However, check valve 130 blocks the flow of pressurized fluid from interior regions, 80, 82, 84, 86 of head, back, seat, and leg section air sacks 72, 74, 76, 78, respectively, to interior region 54 of manifold 40 so that the pressure of the pressurized fluid in interior region 54 of manifold 40 can remain constant even when the person supported on sleeping surface 34 of mattress 12 moves.

When control assemblies 88, 90, 92, 94 each include check valve 130, movement of the person resting on sleeping surface 34 of mattress 12 does not cause a change in the pressure of the pressurized fluid in interior region 54 of manifold 40. Instead, for example, if the person on sleeping surface 34 moves and causes a sudden increase in the pressure of the pressurized fluid in interior region 82 of back section air sack 74, pressurized fluid will flow at an increased mass flow rate through exhaust control orifice 142 as a direct result of the increased pressure differential between the upstream side of exhaust control orifice 142 and the downstream side of exhaust control orifice 142 as predicted by Equation (2). Eventually, steady state will be reached at which the pressure of the pressurized fluid in interior region 82 of back section air sack 74 returns to the selected pressure as determined by the pressure of pressurized fluid in interior region 54 of manifold 40, the size of inlet control orifice 134, and the size of exhaust control orifice 142.

If desired, the size of either inlet control orifice 134, exhaust control orifice 142, or both inlet and exhaust control orifices 134, 142 can be externally adjustable so that the user can adjust the support and firmness characteristics of mattress 12 adjacent to each of head, back, seat, and leg section air sacks 72, 74, 76, 78. In addition, if desired, the sizes of inlet and exhaust control orifices 134, 142 can be automatically adjustable so that the sizes of the orifices 134, 142 are adjustable in response to an input signal. With this type of system, the input signal can either be a user input signal provided by a user or an input signal provided by a controller that is coupled to sensors (not shown) that monitor the pressure of the pressurized fluid in the interior regions of each respective air sack 70. Each sensor would provide a pressure input signal in response to the pressure of the pressurized fluid and the controller would provide the input signal to the automatically adjustable orifice in response to the pressure signal to adjust the size of control orifices 134, 142 to maintain the pressure of the pressurized fluid in each air sack 70 at a predetermined pressure.

Control assemblies 88, 90, 92, 94 control the pressure of pressurized fluid in interior regions 80, 82, 84, 86 of each respective air sack 72, 74, 76, 78 as shown diagrammatically in FIG. 5. Rather than using valves to control the flow of pressurized fluid between a source of pressurized fluid and air sacks 70, the control assembly for mattress 12 utilizes check valves 130 and control orifices 132, 142 to control the flow of pressurized fluid. When the load supported by an air sack of a conventional air mattress abruptly changes, the manifold pressure also changes, disrupting the pressure of the pressurized fluid in each air sack and making it difficult for such conventional systems to maintain the pressures of pressurized fluid in the air sacks at the selected pressures. Check valves 130 of control assemblies 88, 90, 92, 94 in accordance with the present invention prevent disruption of the pressure of the pressurized fluid in interior region 54 of manifold 40 so that when the load supported by one air sack 70 changes, the pressure of pressurized fluid in the other air sacks 70 is not affected.

It should also be noted that although the presently preferred embodiment uses inlet and exhaust control orifices 132, 142 to control the flow of pressurized fluid in the pressure control assembly in accordance with the present invention, other means for reducing pressure can be utilized without exceeding the scope of the invention as presently perceived. For example, Venturi meters, hoses having extended lengths, and other types of restrictors that would result in a reduction of the pressure of pressurized fluid flowing therethrough could be used in place of inlet and exhaust control orifices 132, 142 without exceeding the scope of the invention as presently perceived.

Although the invention has been described in detail with reference to a preferred embodiment, variations and modifications exist within the scope and spirit of the invention as described and defined in the following claims.

What is claimed is:

1. A mattress comprising:

an elongated foam base, a plurality of air sacks positioned above the foam base, each air sack defining an interior region, and a longitudinally-extending manifold including an outer wall defining an interior region in fluid communication with a source of pressurized fluid and in fluid communication with the interior region of each air sack, the foam base being positioned below the manifold.

2. The mattress of claim 1, wherein the outer wall of the manifold is made from a flexible material so that the manifold is a longitudinally extending air bladder that inflates when the pressurized fluid is received in the interior region.

3. The mattress of claim 2, further comprising a longitudinally-extending second air bladder spaced apart from the manifold, the second air bladder having a wall defining an interior region, and the interior region of the second air bladder being in fluid communication with the interior region of the first air bladder so that the second air bladder inflates when the first air bladder inflates.

4. The mattress of claim 1, further comprising a longitudinally-extending first side member positioned between the plurality of air sacks and the foam base, the first side member including ticking material defining an interior region and a foam core received in the interior region of the ticking material, the manifold also being received in the interior region of the first side member.

5. The mattress of claim 1, further comprising a plurality of flow control assemblies, each flow control assembly being associated with at least one air sack of the plurality of air sacks and each flow control assembly defining an interior region in fluid communication with the interior region of the manifold and the interior region of its respective sack so that each air sack is in fluid communication with the manifold, each flow control assembly including a check valve mounted in the conduit to prevent the flow of pressurized fluid from the interior region of each air sack to the interior region of the manifold.

6. A mattress comprising:

an elongated foam base, a plurality of air sacks positioned above the foam base, each air sack defining an interior region, and a longitudinally-extending manifold located between the plurality of air sacks and the foam base with the foam base supporting the manifold, the manifold including an outer wall defining an interior region in fluid communication with a source of pressurized fluid and in fluid communication with the interior region of each air sack.

7. The mattress of claim 6, wherein the outer wall of the manifold includes a flexible air bladder that inflates when the pressurized fluid is received in the interior region.

8. The mattress of claim 7, further comprising a longitudinally-extending second air bladder spaced apart from the manifold, the second air bladder having a wall defining an interior region, and the interior region of the second air bladder being in fluid communication with the interior region of the first air bladder so that the second air bladder inflates when the first air bladder inflates.

9. The mattress of claim 6, further comprising a longitudinally-extending first side member positioned between the plurality of air sacks and the foam base, the first side member including ticking material defining an interior region and a foam core received in the interior region of the ticking material, the manifold also being received in the interior region of the first side member.

10. The mattress of claim 6, wherein the plurality of air sacks are formed to include a notched portion configured to receive the manifold.

11. The mattress of claim 10, wherein the plurality of air sacks include a top surface for supporting a body, the notched portion being formed below the top surface so that the top surface lies over the manifold.

12. A mattress comprising:

an elongated foam base, a plurality of air sacks positioned to lie above the foam base, each air sack defining an interior region.

a longitudinally-extending manifold located between the plurality of air sacks and the foam base, the manifold including an outer wall defining an interior region in fluid communication with a source of pressurized fluid and in fluid communication with the interior region of each air sack, and a plurality of flow control assemblies, each flow control assembly being associated with at least one air sack of the plurality of air sacks and each flow control assembly defining an interior region in fluid communication with the interior region of the manifold and the interior region of its respective sack so that each air sack is in fluid communication with the manifold, each flow control assembly including a check valve mounted in the conduit to prevent the flow of pressurized fluid from the interior region of each air sack to the interior region of the manifold.

13. The mattress of claim 12, wherein each of the plurality of control assemblies further include control orifice restricting the flow of pressurized fluid from the manifold to the air sacks.

14. The mattress of claim 12, wherein each of the plurality of air sacks includes an exhaust line permitting pressurized fluid to escape from the respective sack.

15. A mattress comprising:

a plurality of air sacks, each air sack including an outer walls having a top portion, a pair of side portions, and a bottom portion cooperating to defining an interior region and a longitudinally-extending manifold member including an outer wall having a top portion, a pair of side portions, and a bottom portion cooperating to define an interior region in fluid communication with a source of pressurized fluid and in fluid communication with the interior region of each air sack, the top portion of the manifold being positioned above the bottom portions of the air sacks.

16. The mattress of claim 15, further comprising an elongated foam base, wherein each air sack is positioned above the foam base.

17. The mattress of claim 15, further comprising an elongated foam base, wherein each air sack is positioned above the foam base and the bottom portion of the longitudinally-extending manifold is positioned on the elongated foam base.

18. The mattress of claim 15, wherein the top portion of the manifold is spaced apart from the bottom portions of the air sacks.

19. The mattress of claim 15, wherein the bottom portions of the air sacks cooperate to define a horizontal plane and the bottom portion of the manifold is positioned in the horizontal plane.

20. The mattress of claim 15, wherein the bottom portions of the air sacks cooperate to define a plane and the top portion of the manifold is positioned between the plane and the top portions of the air sacks.

21. A mattress comprising:

a plurality of air sacks, the air sacks cooperating to define a channel and a longitudinally-extending manifold positioned in the channel defined by the air sacks, the longitudinally-extending manifold including an outer wall defining an interior region in fluid communication with a source of pressurized fluid and in fluid communication with the interior region of each air sack.

22. The mattress of claim 21, further comprising an elongated foam base, wherein the air sacks are positioned above the foam base.

23. The mattress of claim 22, wherein the foam base cooperates with the air sacks to define the channel.

24. The mattress of claim 23, wherein the channel is U-shaped.

25. The mattress of claim 21, further comprising a plurality of conduits, wherein each conduit is associated with at least one air sack of the plurality of air sacks to provide fluid communication between the interior region of the manifold and the interior region of the associated air sack, the conduits being positioned in the channel.

26. The mattress of claim 21, wherein the outer wall of the manifold has a top portion, a bottom portion, and a pair of spaced-apart side portions cooperating to define the interior region of the manifold, and at least one of the side portions is positioned in the channel.

27. A mattress comprising:

an elongated foam base, a plurality of air sacks positioned above the foam base, each of the air sacks having an outer wall defining an interior region, and a longitudinally-extending manifold including an outer wall having a top portion, a bottom portion, and a pair of spaced-apart side portions cooperating to define an interior region in fluid communication with a source of pressurized fluid and in fluid communication with the interior region of each air sack, the bottom portion of the manifold being positioned adjacent to the elongated foam base.

28. The mattress of claim 27, wherein the side portions of the outer wall of the manifold are positioned over the elongated foam base.

29. The mattress of claim 27, wherein the outer walls of the air sacks have a top portion, a pair of spaced-apart side portions, and a bottom portion, the bottom portions cooperating to define a plane, and the bottom portion of the outer wall of the manifold is positioned in the plane.

30. The mattress of claim 27, wherein the side portions of the manifold extend upwardly away from the foam base.

31. The mattress of claim 27, further comprising a plurality of conduits, wherein each conduit is associated with at least one air sack of the plurality of air sacks to provide fluid communication between the interior region of the manifold and the interior region of the associated air sack, and the conduits are positioned between the foam base and the air sacks.

* * * * *